US012476031B2

(12) United States Patent
Lin

(10) Patent No.: US 12,476,031 B2
(45) Date of Patent: Nov. 18, 2025

(54) MAGNETIC ATTRACTION FIXING DEVICE WITH ADJUSTABLE MAGNETIC ATTRACTION DISTANCE

(71) Applicant: Shenzhen Huayi Fangyuan Technology Co., Ltd, Guangdong (CN)

(72) Inventor: Binghua Lin, Guangdong (CN)

(73) Assignee: Shenzhen Huayi Fangyuan Technology Co., Ltd, Guangdong (CN)

( * ) Notice: Subject to any disclaimer, the term of this patent is extended or adjusted under 35 U.S.C. 154(b) by 0 days.

(21) Appl. No.: 19/228,465

(22) Filed: Jun. 4, 2025

(65) Prior Publication Data

US 2025/0299860 A1 Sep. 25, 2025

(30) Foreign Application Priority Data

Jun. 6, 2024 (CN) ........................ 202421294850.2

(51) Int. Cl.
*H01F 7/02* (2006.01)

(52) U.S. Cl.
CPC ................................. *H01F 7/0226* (2013.01)

(58) Field of Classification Search
CPC ..................................................... H01F 7/0226
See application file for complete search history.

(56) References Cited

U.S. PATENT DOCUMENTS

2023/0386714 A1* 11/2023 Morgan ............... H01F 7/0247

* cited by examiner

*Primary Examiner* — Mohamad A Musleh
(74) *Attorney, Agent, or Firm* — Hawaii Patent Services; Nathaniel K. Fedde; Kenton N. Fedde

(57) ABSTRACT

The present disclosure relates to a magnetic attraction fixing device with an adjustable magnetic attraction distance, comprising a fixed seat, a movable seat, and a magnetic attraction component. The movable seat is provided with a fitting surface for contacting a target object, the magnetic attraction component is arranged on the fixed seat and is used to magnetically attract the target object to be fitted to the fitting surface. The movable seat is arranged on the fixed seat and rotates around an axis, and a distance adjustment structure is provided between the movable seat and the fixed seat.

20 Claims, 12 Drawing Sheets

MAGNETIC ATTRACTION FIXING DEVICE WITH ADJUSTABLE MAGNETIC ATTRACTION DISTANCE

CROSS-REFERENCE TO RELATED APPLICATIONS

This application claims priority to the Chinese utility model patent application filed on Jun. 6, 2024, with application number 202421294850.2, titled "Magnetic Attraction Fixing Device with Adjustable Magnetic Attraction Distance", the entire content of which, including the amendments thereof, are incorporated herein by reference in its entirety.

TECHNICAL FIELD

The present disclosure relates to the technical field of magnetic attraction fixing devices, particularly to a magnetic attraction fixing device with an adjustable magnetic attraction distance.

BACKGROUND

Current magnetic suction stands widely used in the field of electronic device support face technical bottlenecks in magnetic force adjustment. Although fixing devices based on magnetic coupling principles can achieve rapid adsorption and positioning of devices and integrate wireless charging functions to enhance convenience, the fixed magnetic attraction force affects the adaptability of devices, which urgently needs to be resolved.

Existing technologies, such as the wireless charging device disclosed in U.S. Pat. No. 12,119,679, feature a rigid coupling system composed of a magnetic attraction part and an adsorption disk, lacking a dynamic adjustment mechanism for magnetic attraction force. This results in difficulties in removing small devices due to excessive magnetic attraction force and unstable fixation of large devices due to insufficient magnetic attraction force when handling electronic devices of varying mass specifications.

SUMMARY

The present disclosure provides a magnetic attraction fixing device with an adjustable magnetic attraction distance to address the issues raised in the background art.

This application is implemented through the following technical solution.

The technical solution provides a magnetic attraction fixing device with an adjustable magnetic attraction distance for magnetically attracting and fixing a target object. It includes a fixed seat, a movable seat, and a magnetic attraction component. The movable seat is provided with a fitting surface for contacting the target object, and the magnetic attraction component is arranged on the fixed seat for magnetically attracting the target object to be fitted to the fitting surface.

The movable seat is arranged on the fixed seat and rotates around an axis. A distance adjustment structure is provided between the movable seat and the fixed seat. The movable seat changes the magnetic attraction distance between the fitting surface and the magnetic attraction component through the distance adjustment structure when rotating.

The technical effect of this solution is that by providing a distance adjustment structure between the movable seat and the fixed seat, the distance between them is altered to adjust the magnetic attraction distance. The change in magnetic attraction distance modifies the magnitude of the magnetic attraction force on the target object, enabling adjustment of the magnetic force. This achieves easy placement and removal of the target object while ensuring it does not easily fall.

In an embodiment of this technical solution, the distance adjustment structure comprises an inner ring and an outer ring. The outer ring is sleeved over the inner ring, with a plurality of spiral chutes provided on the inner side wall of the outer ring, and a plurality of protrusions on the outer side wall of the inner ring that fit into the spiral chutes.

One of the inner ring and the outer ring is connected to the fixed seat, while the other is connected to the movable seat.

Thus, the sleeving of the inner and outer rings achieves a rotational connection between the fixed seat and the movable seat while also enabling adjustment of the magnetic attraction distance.

In an embodiment of this technical solution, the inner ring is connected to the movable seat; alternatively, the inner ring and the movable seat are of an integrated structure.

In an embodiment of this technical solution, the outer ring is connected to the fixed seat; alternatively, the outer ring and the fixed seat are of an integrated structure.

In an embodiment of this technical solution, at least one first limiting part is provided in the spiral chute, and at least one second limiting part that can cooperate with the first limiting part is provided on the protrusion. The first and second limiting parts cooperate to limit the rotational position of the movable seat.

Further, the first limiting part is a bump on the bottom surface of the spiral chute, and the second limiting part is a recess on the end face of the protrusion.

In an embodiment of this technical solution, the inner side wall of the outer ring is further provided with a plurality of insertion slots respectively communicating with each of the spiral chutes, and the insertion slots are arranged corresponding to the protrusions.

In an embodiment of this technical solution, the magnetic attraction component is a magnet located inside the inner ring.

In an embodiment of this technical solution, the fixed seat further comprises a connecting part for securing a connector. The connector is used to connect components supporting the fixed seat, such as a ball head mount or linkage. When the ball head mount is fixed to the connecting part with screws, the ball head mount can then connect to a base for desktop placement or a clamp for automotive use, forming a magnetic stand.

In an embodiment of this technical solution, the distance adjustment structure comprises an outer ring and an inner ring. The outer ring is sleeved over the inner ring, with internal threads on the inner side wall of the outer ring and external threads on the outer side wall of the inner ring that match with the internal threads;

- one of the inner ring and the outer ring is connected to the fixed seat, while the other is connected to the movable seat.

Thus, as an alternative to the sleeved connection of the inner and outer rings, the distance adjustment structure can employ a threaded connection between them, equally capable of adjusting the magnetic attraction distance.

In an embodiment of this technical solution, the distance adjustment structure comprises a stud and a boss with a screw hole, where the stud engages with the screw hole. The center of one of the fixed seat and the movable seat is provided with the stud, while the center of the other is provided with the boss.

In an embodiment of this technical solution, the distance adjustment structure further comprises an inner ring and an outer ring. The outer ring is sleeved over the inner ring, with one of the inner ring and the outer ring connected to the fixed seat and the other connected to the movable seat.

The inner side of the outer ring is provided with at least one first limiting part, and the outer side of the inner ring is provided with at least one second limiting part that can cooperate with the first limiting part. The first and second limiting parts cooperate to limit the rotational position of the movable seat. Alternatively, a lock nut is arranged between the outer ring and the inner ring.

It should be understood that the general description above and the detailed description below are merely exemplary and explanatory and do not limit the present disclosure.

BRIEF DESCRIPTION OF DRAWINGS

The drawings, which form part of this application, are included to provide a further understanding of the present disclosure. The illustrative embodiments and the descriptions thereof are intended to explain the present disclosure and do not constitute an undue limitation thereof. In the drawings.

Figure 1:
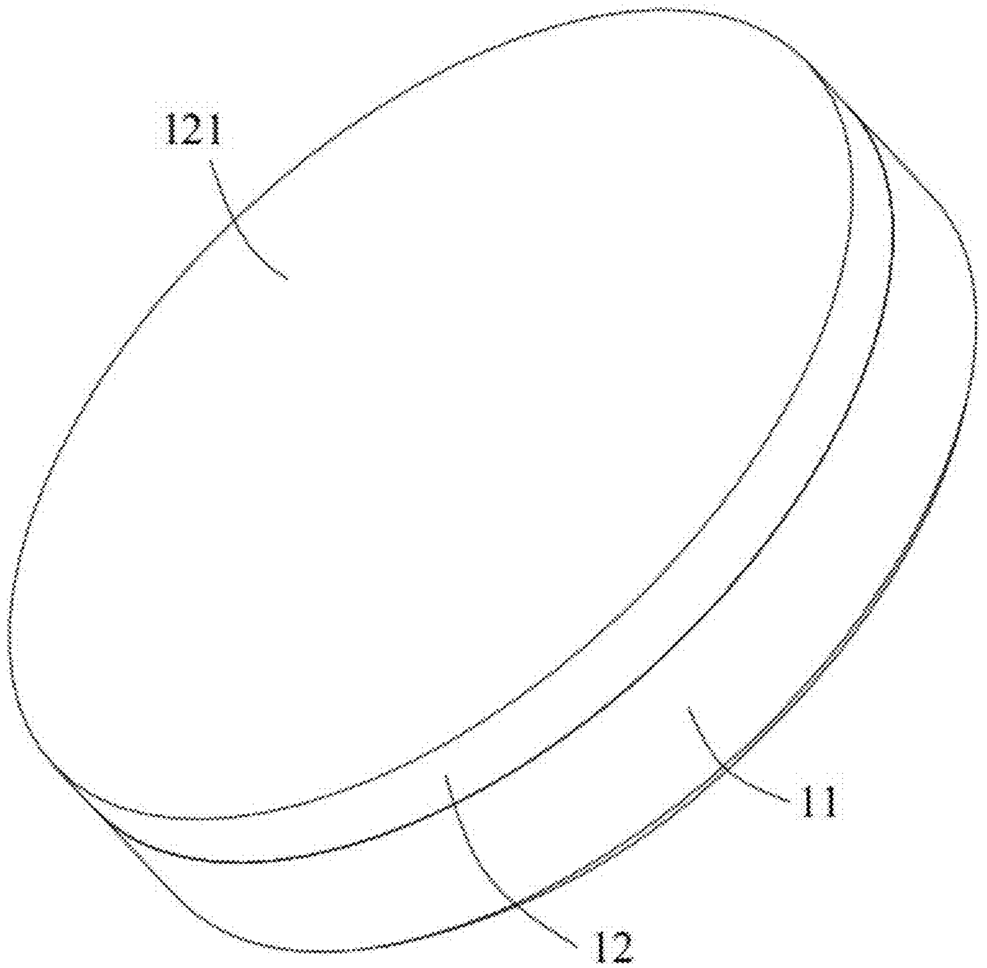
FIG. 1 is a first schematic structural diagram of part of the magnetic fixation device shown in Embodiment 1 of this application.

Reference signs: Fixed seat (11); Outer ring (112); Spiral chute (113); Bump (114); Insertion slot (115); Connecting part (116); Boss (117); Screw hole (1171); Limiting lug (118); Movable seat (12); Fitting surface (121); Inner ring (122); Protrusion (123); Recess (124); Stud (127); Limiting groove (128); Magnetic attraction component (13); Pull rod (131); Sliding chute (132); Baffle (133); Retaining ring (134); Threaded rod (135); Threaded hole (136); Lock nut (14); Limiting slot (15); Limiting block (16); Movement hole (17); Movement rod (18).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Embodiment 1

This embodiment describes a magnetic attraction fixing device with an adjustable magnetic attraction distance, which is used to magnetically attract and secure a target object. In this embodiment, the magnetic attraction fixing device is exemplified as a magnetic phone holder, and the target object is exemplified as a mobile phone.

Figure 3:
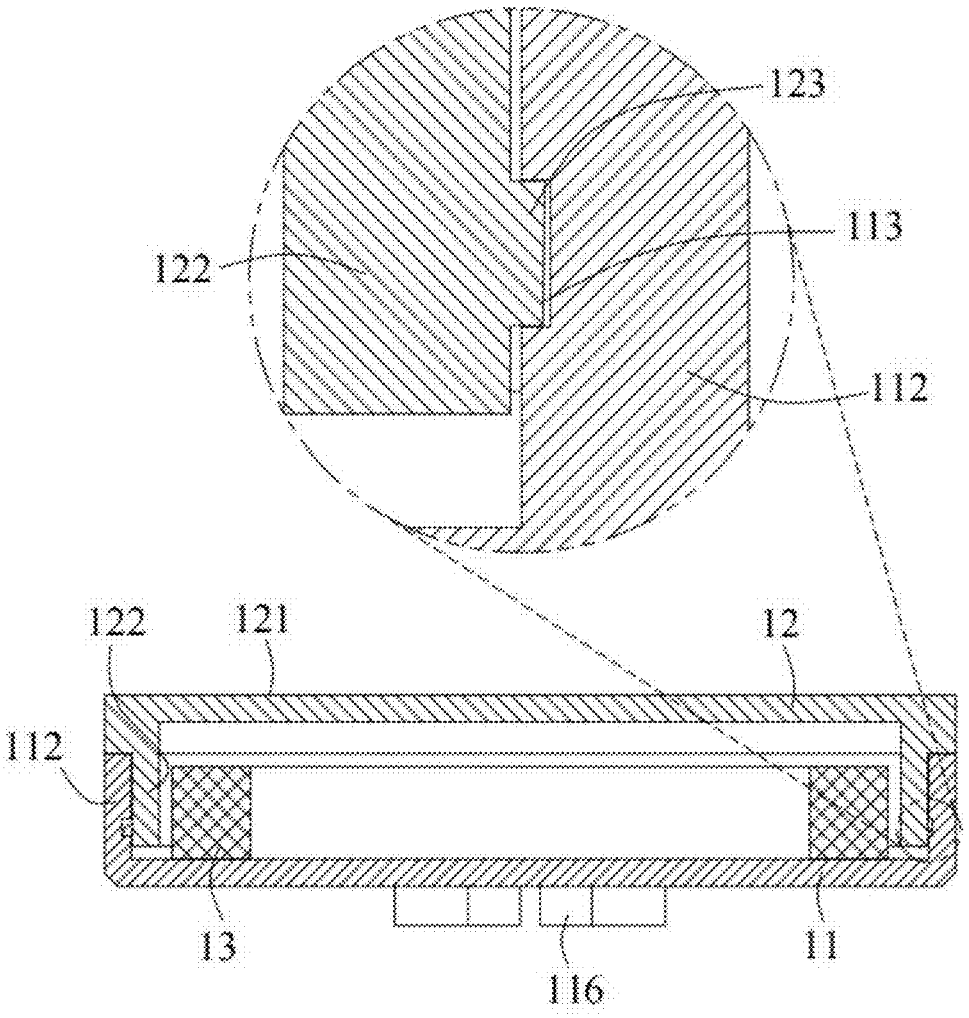
FIG. 3 is a cross-sectional schematic diagram and partial enlarged view of part of the magnetic fixation device shown in Embodiment 1 of this application.

As shown in FIGS. 1 and 3, in this embodiment, the magnetic phone holder includes a fixed seat 11, a movable seat 12, and a magnetic attraction component 13. The movable seat 12 is provided with a fitting surface 121 for contacting a phone. The magnetic attraction component 13 is mounted on the fixed seat 11 and is used to magnetically attract the phone to be fitted to the fitting surface 121. The magnetic attraction component 13 is protected through the cooperation of the fixed seat 11 and the movable seat 12. The movable seat 12 is mounted on the fixed seat 11 and rotates about an axis. A distance adjustment structure is provided between the movable seat 12 and the fixed seat 11. When the movable seat 12 rotates, the distance adjustment structure changes the magnetic attraction distance between the fitting surface 121 and the magnetic attraction component 13, i.e., the axial spacing between the magnetic attraction component 13 and the fitting surface 121 is altered by the rotational movement of the movable seat 12 relative to the fixed seat 11. By adjusting the magnetic attraction distance between the movable seat 12 and the magnetic attraction component 13, the magnetic attraction force between the magnetic attraction component 13 and the phone can be modified.

Thus, by incorporating the distance adjustment structure between the movable seat 12 and the fixed seat 11, the distance between the movable seat 12 and the fixed seat 11 can be altered to adjust the magnetic attraction distance. The change in magnetic attraction distance modifies the magnetic attraction force on the phone, enabling the adjustment of magnetic strength. This achieves the effect of easily placing and removing the phone while ensuring it remains securely in place and is less prone to falling.

Figure 4:
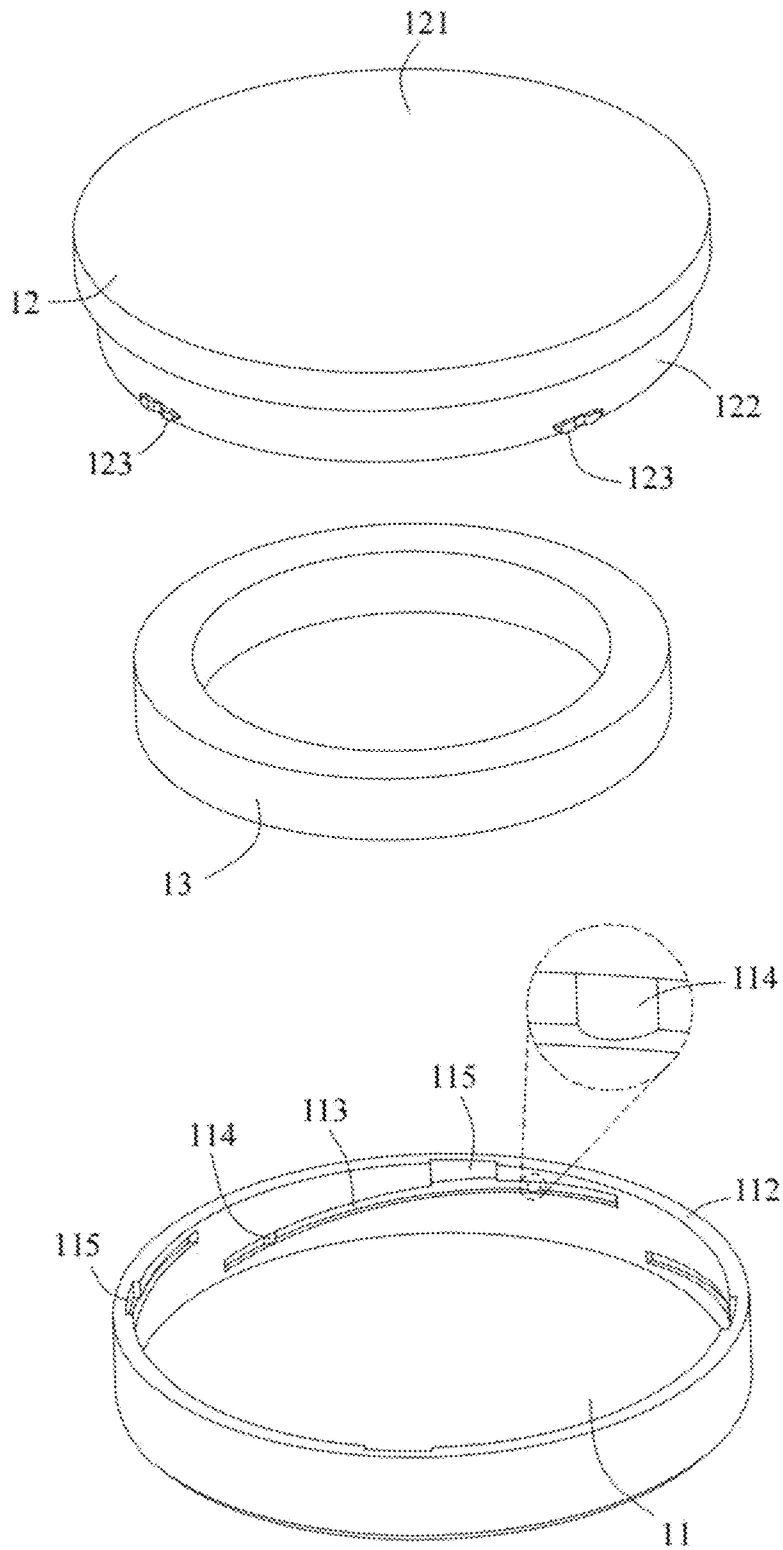
FIG. 4 is an exploded schematic diagram of part of the magnetic fixation device shown in Embodiment 1 of this application.
Figure 5:
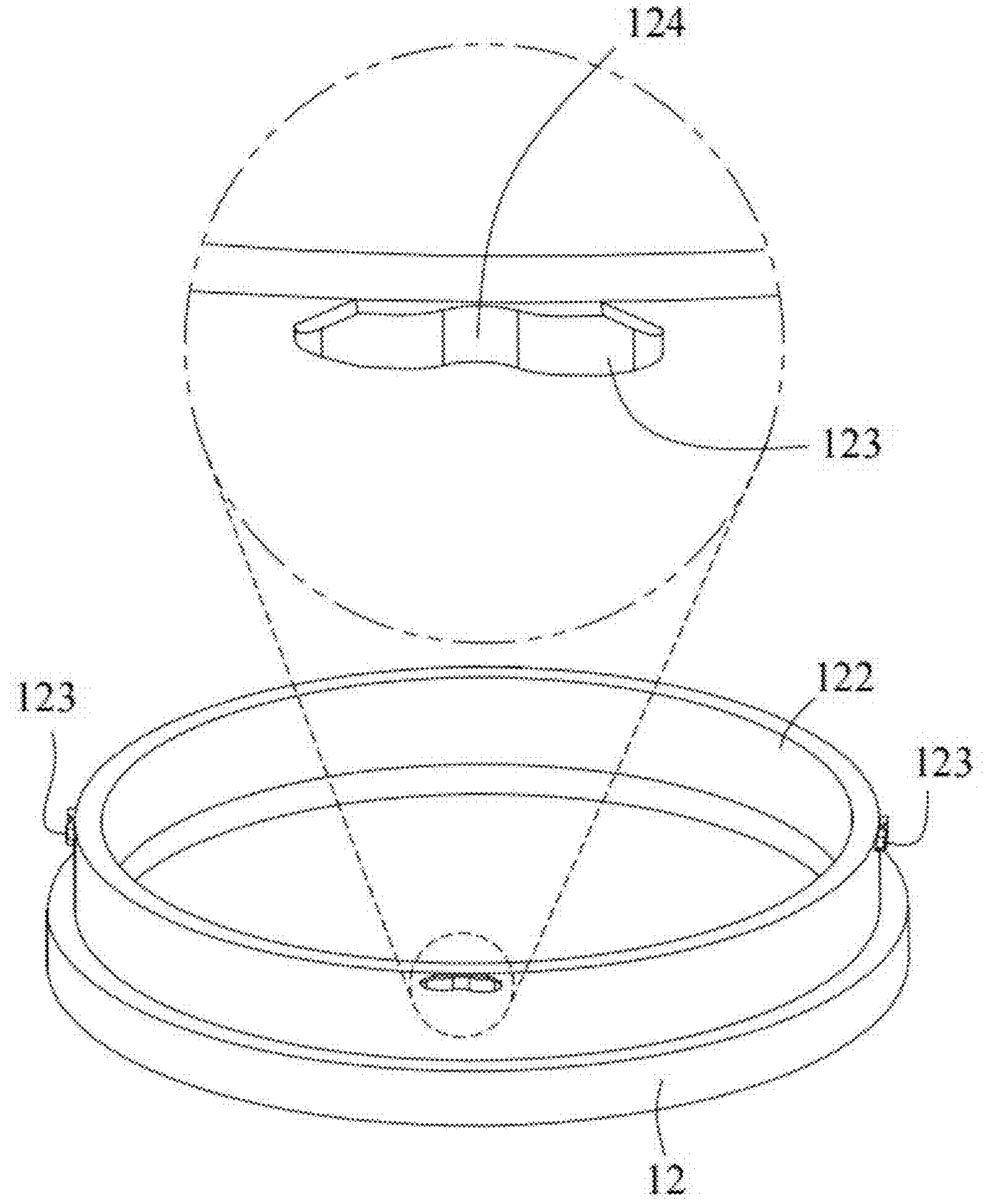
FIG. 5 is a schematic diagram and partial enlarged view of the movable seat of the magnetic fixation device shown in Embodiment 1 of this application.

As shown in FIGS. 3, 4, and 5, in this embodiment, the distance adjustment structure includes an inner ring 122 and an outer ring 112. The outer ring 112 is sleeved over the inner ring 122. The inner sidewall of the outer ring 112 is provided with a plurality of spiral chutes 113, while the outer sidewall of the inner ring 122 is equipped with a plurality of protrusions 123 that fit into the spiral chutes 113. When the protrusions 123 move within the spiral chutes 113, the inner ring 122 and outer ring 112 maintain relative rotation. The shapes of the protrusions 123 and spiral chutes 113 are not limited to those shown in the drawings and can be configured according to actual needs. The inner ring 122 is connected to the movable seat 12, and the outer ring 112 is connected to the fixed seat 11. Thus, the sleeving of the inner ring 122 and outer ring 112 achieves rotational connection between the fixed seat 11 and movable seat 12, while also enabling adjustment of the magnetic attraction distance. This adjustment of the magnetic attraction distance alters the magnitude of the magnetic force.

Here, the number of spiral chutes 113 ranges from one to four, all arranged symmetrically around the axis. The ends of the spiral chutes 113 are not through, therefore the length of the spiral chutes 113 limits the maximum rotation angle of the movable seat 12. The inner ring 122 and movable seat 12 form an integrated structure, as do the outer ring 112 and fixed seat 11. Both the movable seat 12 and fixed seat 11 can be made of plastic injection molding or metal materials. The integrated structure not only reduces the number of components, eliminating the need for separate installation parts, but also lightens the weight between the inner ring 122 and movable seat 12, as well as between the outer ring 112 and fixed seat 11. Additionally, it ensures good sealing between the inner ring 122 and movable seat 12, as well as between the outer ring 112 and fixed seat 11.

In other embodiments (not shown), an eccentric cam is installed at the bottom of the movable seat 12, and the fixed seat 11 is provided with an arc-shaped guide rail matching the eccentric cam. When the movable seat 12 is rotated, the eccentric cam moves along the trajectory of the guide rail, causing periodic height changes in the movable seat 12. By configuring a plurality of eccentric bumps 114 to cooperate with the rail grooves, abrupt changes in magnetic force can be achieved at three typical positions: 0°, 45° and 90°. This structure is suitable for scenarios requiring rapid switching between strong and weak magnetic forces (e.g., medical device mounting brackets).

In other embodiments (not shown), the movable seat 12 is equipped with a T-shaped guide rail at its bottom, and the fixed seat 11 has a slider groove at the corresponding position. The two are connected via a damped sliding module. The magnetic attraction component 13 is mounted on a horizontally movable magnet base, which is linked to the slider through a linkage mechanism. When the movable seat 12 is pushed to slide horizontally, the displacement is amplified by the lever principle, causing the magnetic attraction distance to change exponentially. This design is suitable for industrial equipment requiring wide-range magnetic force adjustment.

In other embodiments (not shown), the movable seat 12 and the fixed seat 11 form a sealed air chamber containing a compressible airbag. Rotating the movable seat 12 changes the chamber volume via a threaded structure, and the resulting air pressure variation drives the magnetic attraction component 13 to displace. A pressure gauge displays the real-time pressure value, while a relief valve enables quick reset. This solution allows stepless adjustment and features shock-absorbing properties, making it particularly suitable for securing precision instruments.

In other embodiments (not shown), the movable seat 12 integrates a toothed ring at its bottom, while the fixed seat 11 houses an adjustment gear that meshes with the toothed ring. The adjustment gear is manually driven by a knob. When the knob is rotated, the gear drives the toothed ring to move axially, thereby altering the distance between the movable seat 12 and the magnetic attraction component 13. The side of the toothed ring features scale markings, enabling precise graded magnetic force adjustment.

In other embodiments (not shown), a compression spring assembly is added between the movable seat 12 and the fixed seat 11. The movable seat 12 is connected to the fixed seat 11 via a threaded structure, where rotating the movable seat 12 causes axial displacement of the threads, and the spring assembly provides counteracting elastic force. When the user rotates the movable seat 12 to the target position, the spring pressure causes the limiting latch to engage with the groove on the fixed seat 11, achieving tactile feedback and anti-slip. This design is particularly suitable for automotive scenarios, maintaining magnetic stability even during vehicle vibrations.

As shown in FIG. 4, in this embodiment, to enable the movable seat 12 to be positioned after adjusting the magnetic attraction distance by rotation, at least one first limiting part is provided in the spiral chute 113, and at least one second limiting part that can cooperate with the first limiting part is provided on the protrusion 123. The first and second limiting parts cooperate to limit the rotational position of the movable seat 12, preventing it from detaching from the fixed seat 11 during rotation, ensuring the alignment of the movable seat 12 and the fixed seat 11, and facilitating the coordinated use of the movable seat 12 and the fixed seat 11.

As shown in FIGS. 4 and 5, the first limiting part is a bump 114 on the bottom surface of the spiral chute 113, and the second limiting part is a recess 124 on the end face of the protrusion 123. The number of bumps 114 is one or more, preferably one to six, arranged for positioning at intervals such as 5, 10, or 15 degrees of rotation, while the recess 124 is singular. To allow the bump 114 to slide into the recess 124, inclined or curved guiding surfaces are provided on both sides of the protrusion 123, facilitating the movement of the bump 114 from the guiding surface into the recess 124.

As shown in FIG. 4, for ease of disassembly and assembly, enabling the protrusion 123 to be fitted into the spiral chute 113, the inner sidewall of the outer ring 112 is provided with a plurality of insertion slots 115 respectively communicating with each spiral chute 113. The insertion slots 115 correspond to the protrusions 123, allowing the protrusions 123 to be inserted into the spiral chutes 113 along the insertion slots 115, simplifying the disassembly and installation of the movable seat 12 and the fixed seat 11.

As shown in FIG. 4, the magnetic attraction component 13 is an annular magnet, located within the inner ring 122. The magnetic attraction component 13 is fixedly installed on the fixed seat 11. By securing the magnetic attraction component 13 to the fixed seat 11 and coordinating it with the inner ring 122, the magnetic attraction component 13 remains positioned between the fixed seat 11 and the inner ring 122, preventing the magnetic attraction component 13 from falling out.

In other embodiments (not shown), the magnetic attraction component 13 consists of a permanent magnet and a surrounding electromagnetic coil, with the movable seat 12 incorporating an angle sensor. When the movable seat 12 is rotated, the sensor transmits angle signals to the control module, dynamically adjusting the coil current intensity. This hybrid magnetic attraction system allows for both manual mechanical adjustment and intelligent magnetic force matching via an APP, making it suitable for high-end consumer electronics.

Figure 2:
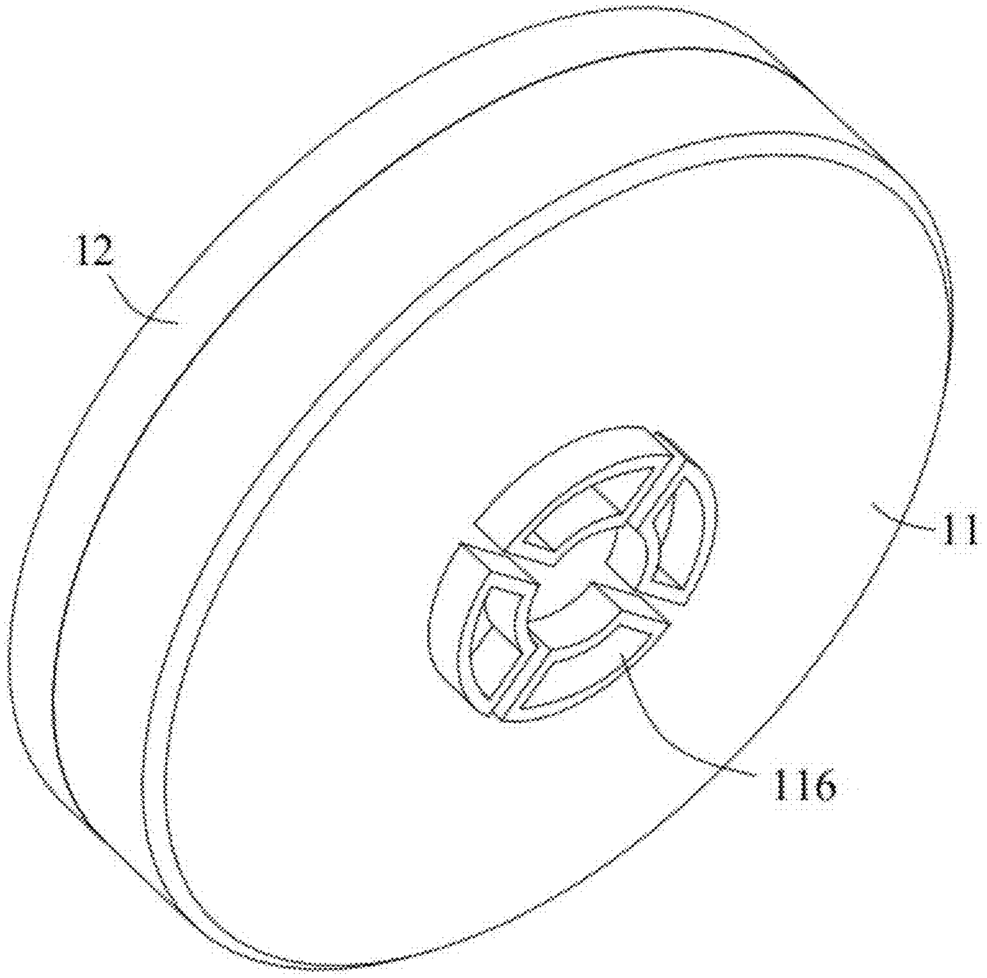
FIG. 2 is a second schematic structural diagram of part of the magnetic fixation device shown in Embodiment 1 of this application.

As shown in FIGS. 2 and 3, the fixed seat 11 also includes a connecting part 116, which is used to secure a connector (not shown). The connector is a component for connecting and supporting the fixed seat 11, such as a ball socket and linkage. When the ball socket is fixed to the connecting part 116 with screws, the ball socket can then connect to a base placed on a desk or a clamp mounted in a car, forming a magnetic phone holder. The magnetic phone holder provides excellent magnetic fixation and allows the phone to be easily removed for use at any time.

In another embodiment (not shown), the distance adjustment structure includes an outer ring 112 and an inner ring 122. The outer ring 112 is sleeved over the inner ring 122, with the inner wall of the outer ring 112 featuring internal threads and the outer wall of the inner ring 122 featuring matching external threads. The inner ring 122 is connected to the movable seat 12, while the outer ring 112 is connected to the fixed seat 11. Thus, as an alternative connection method between the inner ring 122 and the outer ring 112, the threaded connection structure for the inner ring 122 and the outer ring 112 of the distance adjustment structure can also adjust the magnetic attraction distance.

In other embodiments (not shown), shape-memory alloy wires are arranged between the movable seat 12 and the fixed seat 11, with the wires coiled around a temperature-controlled turntable. When the ambient temperature changes or active temperature control is applied via heating elements, the contraction rate of the alloy wires changes, driving the turntable to rotate and causing the movable seat 12 to move up or down. This design enables the development of an intelligent holder that adapts to environmental temperatures, making it particularly suitable for outdoor equipment fixation scenarios.

In other embodiments (not shown), the movable seat 12 contains an annular cavity filled with magnetorheological fluid, and the electromagnetic polar plates of the fixed seat 11 can alter the fluid's viscosity properties. By adjusting the distance between the polar plates and the electromagnetic field intensity when rotating the movable seat 12, the degree of fluid solidification changes, dynamically adjusting the effective magnetic attraction distance. This solution offers millisecond-level response speeds, making it suitable for scientific research fields requiring real-time magnetic force adjustment.

Embodiment 2

Figure 6:
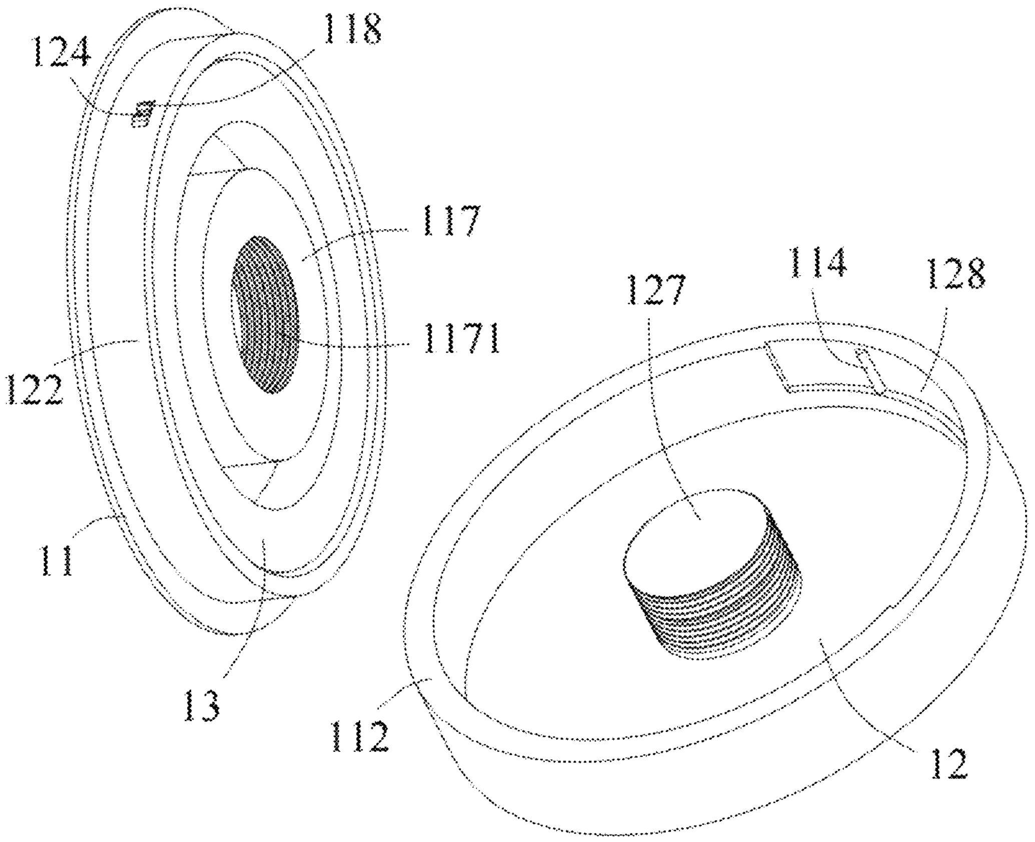
FIG. 6 is an exploded schematic diagram of part of the magnetic fixation device shown in Embodiment 2 of this application.

As shown in FIG. 6, Embodiment 2 is a magnetic attraction fixing device with an adjustable magnetic attraction distance. The difference from the first embodiment lies in the distance adjustment structure, which in this embodiment includes a stud 127 and a boss 117 with a screw hole 1171. The stud 127 engages with the screw hole 1171, where one of the movable seats 12 is centrally provided with the stud 127, and the fixed seat 11 is centrally provided with the boss 117. Specifically, the axis of the stud 127 and the screw hole 1171 is coaxial with the rotation axis of the movable seat 12, ensuring the stud 127 maintains alignment with the movable seat 12 during rotation to prevent deviation of the stud 127 during rotation.

Thus, by engaging the stud 127 with the screw hole 1171, rotating the movable seat 12 changes the distance between the movable seat 12 and the fixed seat 11, thereby adjusting the magnetic attraction distance.

In this embodiment, after the movable seat 12 is rotated to adjust the magnetic attraction distance, it can be positioned. The adjustment structure also includes an inner ring 122 and an outer ring 112. The outer ring 112 is sleeved over the inner ring 122, with one of them connected to the fixed seat 11 and the other to the movable seat 12. The inner side of the outer ring 112 is provided with at least one first limiting part, and the outer side of the inner ring 122 is provided with at least one second limiting part that can cooperate with the first limiting part. The cooperation between the first and second limiting parts limits the rotation position of the movable seat 12.

Specifically, the inner sidewall of the outer ring 112 is provided with a limiting groove 128, and the outer sidewall of the inner ring 122 is provided with a limiting lug 118. The limiting lug 118 is confined to move within the limiting groove 128, the length of which determines the maximum rotation angle of the movable seat 12. To define specific rotation positions, the first limiting part is a bump 114 on the bottom surface of the limiting groove 128, and the second limiting part is a recess 124 on the end face of the limiting lug 118. The structures of the first and second limiting parts are consistent with those in the first embodiment. To facilitate the sliding of the bump 114 into the recess 124, inclined or curved guide surfaces are provided on both sides of the protrusion 123, allowing the bump 114 to smoothly move from the guide surface into the recess 124.

In other embodiments (not shown), a micro-accelerometer is installed inside the stud 127. When high-frequency vibrations lasting more than 0.5 seconds (such as vehicle jolts) are detected, it automatically triggers an emergency locking mechanism: the piezoelectric ceramic sheet hidden in the fixed seat 11 instantly expands, filling the thread gap to a tolerance-fit state. Simultaneously, four auxiliary suction cups pop out from the edge of the movable seat 12, forming a dual fixation. This design innovatively reduces the dynamic response time to 80 ms, making it particularly suitable for intense motion scenarios like motorcycle riding.

In other embodiments (not shown), a micro power generation module is integrated between the movable seat 12 and the fixed seat 11. When the user rotates the movable seat 12, a piezoelectric wafer array on the outer wall of the inner ring 122 and a friction power generation strip of the fixed seat 11 generate relative motion, converting mechanical energy into electrical energy stored in a supercapacitor. The generated electricity can power the built-in LED indicator or be output externally via a USB-C port.

In other embodiments (not shown), a phase-change material layer is installed inside the movable seat 12. When the ambient temperature exceeds 45° C., the paraffin-based material expands, pushing the magnetic attraction component 13 outward by 2 mm, automatically reducing magnetic force to prevent overheating damage to the phone battery. Meanwhile, the fixed seat 11 incorporates a PTC heating element that actively warms up in low-temperature environments to melt frozen adjustment structures. This dual-temperature control system enables the device to operate in extreme conditions from −30° C. to 60° C., meeting special requirements such as polar expeditions.

In other embodiments (not shown), a waterproof labyrinth seal structure is placed between the movable seat 12 and the fixed seat 11, with all moving parts made of 316L stainless steel. The magnetic attraction component 13 is replaced with a samarium-cobalt magnet and encapsulated in a nano-hydrophobic coating, ensuring most magnetic force is retained even at depths of 30 meters underwater. Notably, the distance adjustment structure is equipped with an anti-misoperation latch, requiring simultaneous pressing of safety buttons on both sides to rotate and adjust.

Embodiment 3

Figure 7:
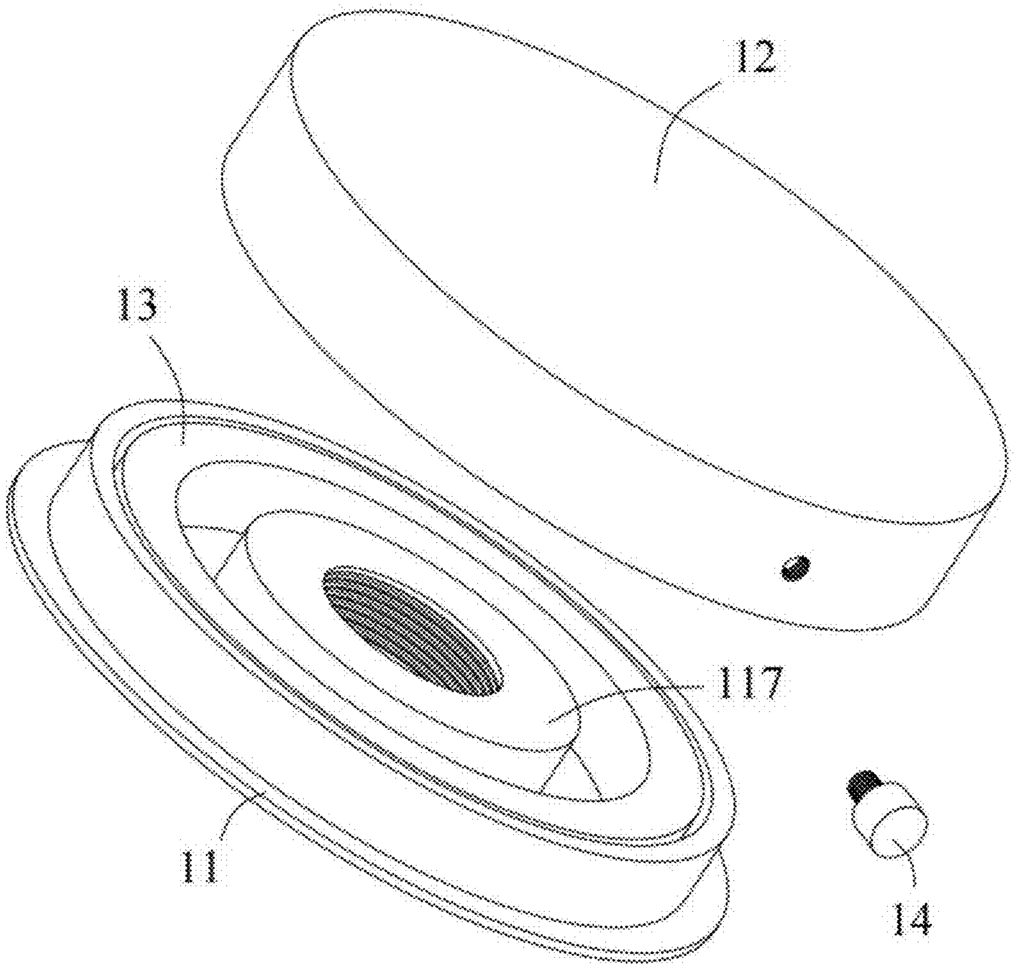
FIG. 7 is an exploded schematic diagram of part of the magnetic fixation device shown in Embodiment 3 of this application.

As shown in FIGS. 6 and 7, the difference between this Embodiment 3 and the Embodiment 2 is that, as an alternative to the limiting groove 128 and limiting lug 118, as well as the first and second limiting parts, a lock nut 14 is installed between the outer ring 112 and the inner ring 122. The lock nut 14 abuts against the fixed seat 11 to limit the rotational position of the movable seat 12.

In other embodiments (not shown), the bottom of the movable seat 12 is embedded with a pressure sensor array, which is electrically connected to the control module inside the fixed seat 11. When the user rotates the movable seat 12, the pressure data is fed back to the control module in real time, dynamically adjusting the current intensity of the electromagnetic coil through a PID algorithm to optimize the match between the magnetic attraction force and the current magnetic attraction distance. Notably, a touchscreen is added to the side of the fixed seat 11, displaying the current magnetic force level, phone battery level, and recommended adjustment angle. This design is suitable for high-end office scenarios, achieving intelligent human-machine interaction.

In other embodiments (not shown), the surface of the movable seat 12 is equipped with expandable modular interfaces. The fitting surface 121 adopts a honeycomb hollow design, embedding standardized magnetic attraction expansion plates (not shown). Each expansion plate is pre-installed with layers of materials of different magnetic permeability (such as silicon steel sheets, permalloy, etc.), altering the overall magnetic circuit characteristics by replacing the expansion plates. Notably, an NFC recognition chip is added to the bottom of the fixed seat 11. When inserting a tablet-specific expansion plate with an electronic tag, the upper limit of the magnetic attraction force is automatically increased to 2.5 kgf. This solves compatibility issues with a plurality of devices and is particularly suitable for use in 3C product experience stores.

Figure 8:
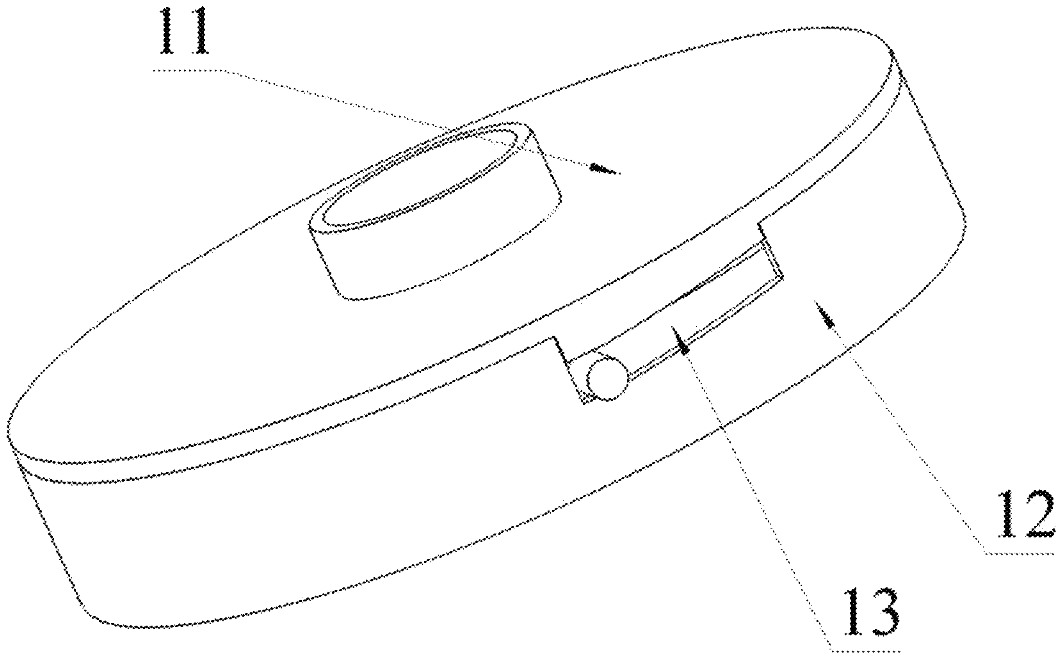
FIG. 8 is a schematic diagram of the magnetic fixation device in other embodiments corresponding to FIG. 1 of this application.
Figure 9:
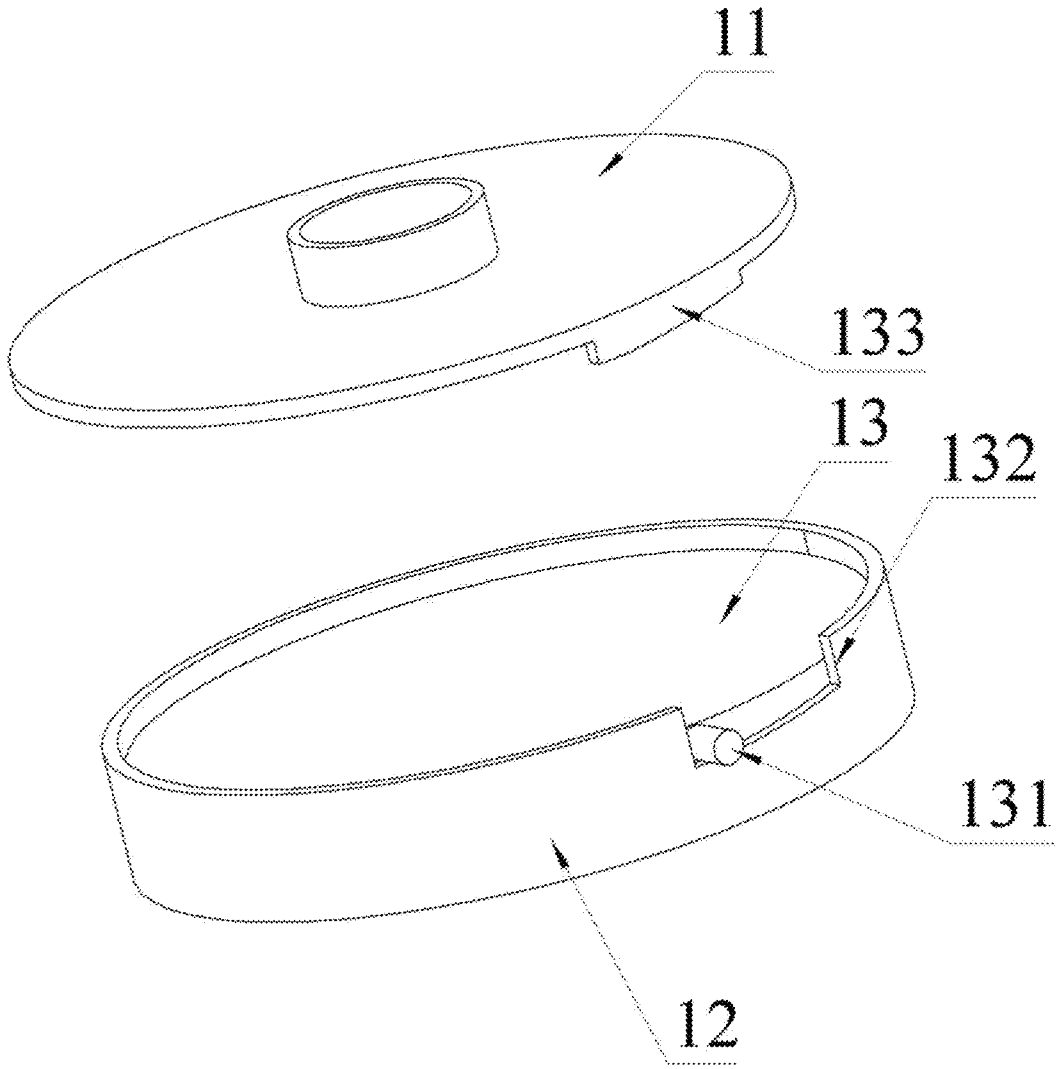
FIG. 9 is an exploded schematic diagram of the magnetic fixation device in FIG. 8 of this application.

In other embodiments (as shown in FIGS. 8 and 9), the outer side of the movable seat 12 is provided with a sliding chute 132, and the bottom of the fixed seat 11 is equipped with a baffle 133. The baffle 133 is inserted into the sliding chute 132, with both the sliding chute 132 and the baffle 133 arranged in a sloping shape. The magnetic attraction component 13 is located inside the movable seat 12, and its outer side is equipped with a pull rod 131 that extends outside the sliding chute 132. By pulling the pull rod 131 to move within the sliding chute 132, the magnetic attraction component 13 is rotated, adjusting the position of the magnetic attraction component 13 within the movable seat 12. The change in the position of the magnetic attraction component 13 regulates the magnetic force between the magnetic attraction component 13 and the phone.

Figure 10:
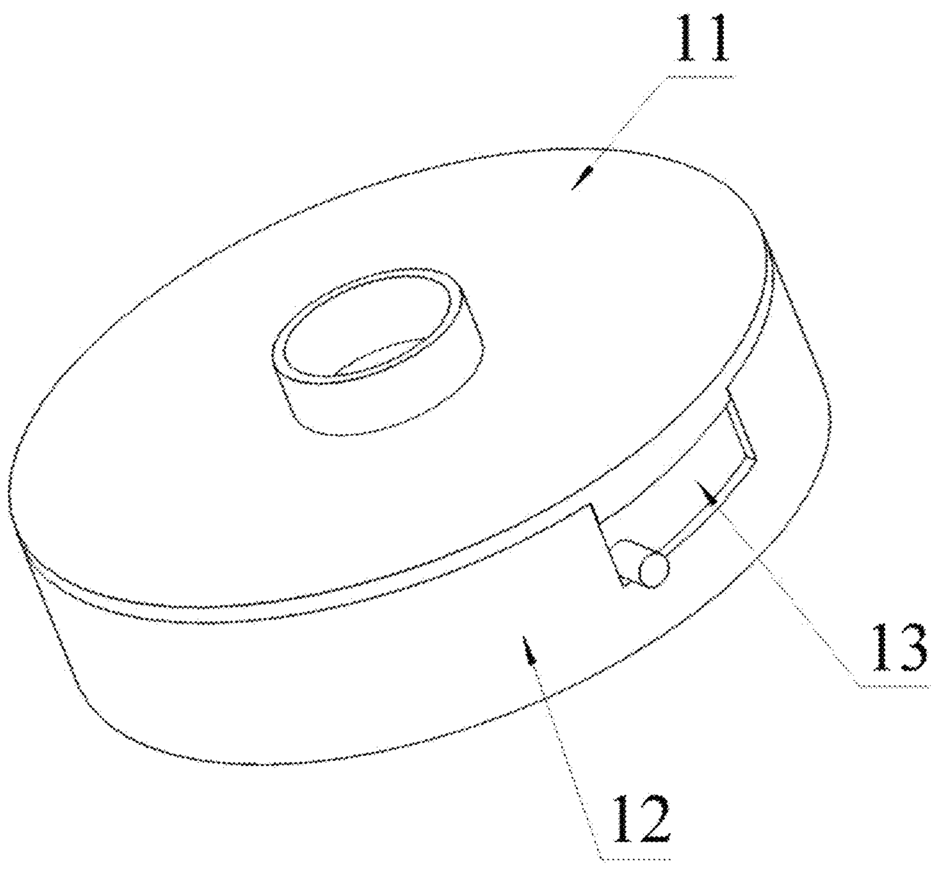
FIG. 10 is a schematic diagram of another embodiment of the magnetic fixation device in FIG. 8 of this application.
Figure 11:
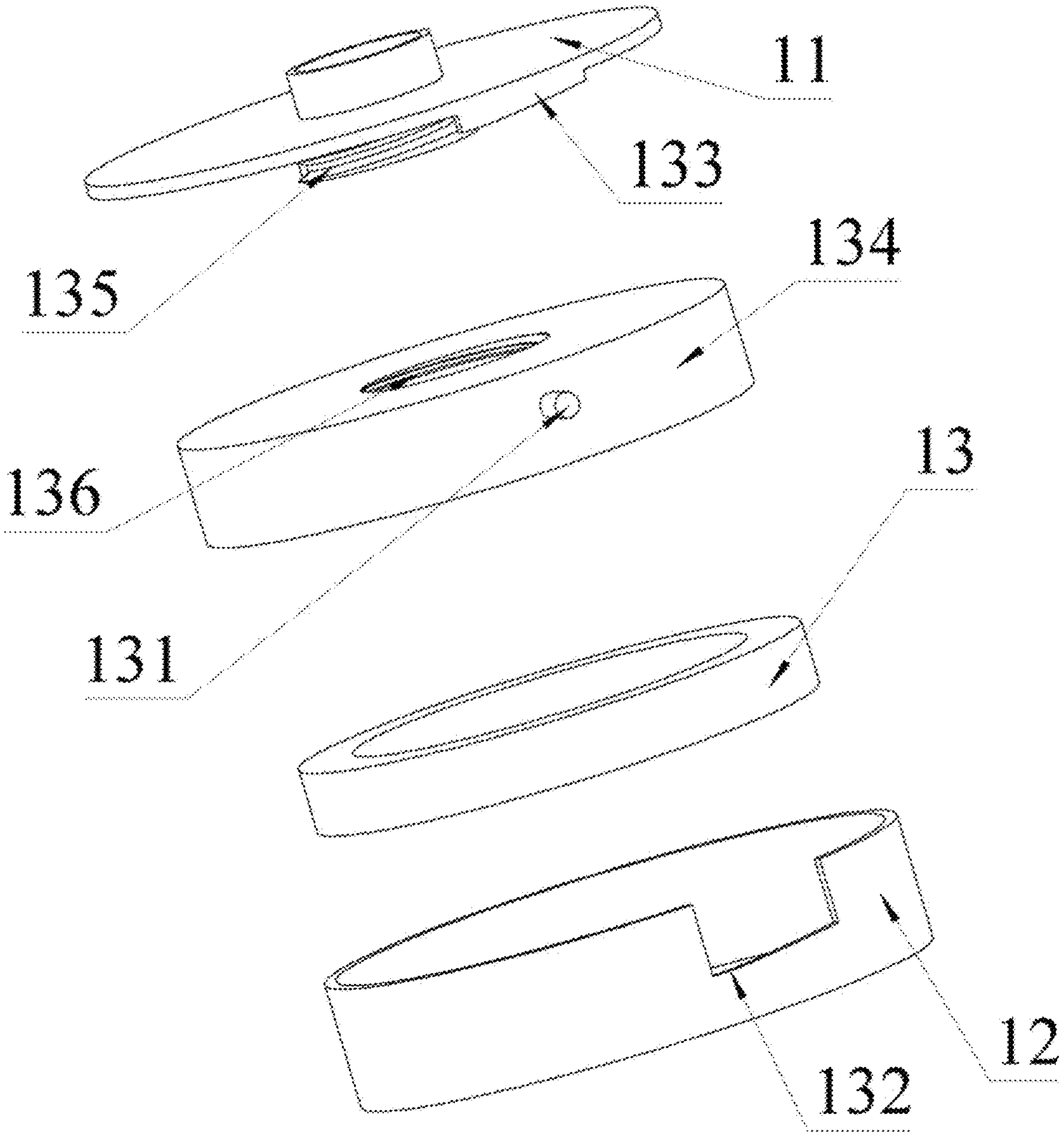
FIG. 11 is an exploded schematic diagram of the magnetic fixation device in FIG. 10 of the present disclosure.

In other embodiments (as shown in FIGS. 10 and 11), the outer side of the movable seat 12 is provided with a sliding chute 132, while the bottom of the fixed seat 11 is equipped with a baffle 133 and a threaded rod 135. The baffle 133 is inserted into the sliding chute 132, and both the baffle 133 and the sliding chute 132 are arranged in a sloping shape. The interior of the movable seat 12 contains a retaining ring 134, whose top is provided with a threaded hole 136 that matches the threaded rod 135. The magnetic attraction component 13 is placed inside the retaining ring 134, and the outer side of the retaining ring 134 is provided with a pull rod 131 that extends outside the sliding chute 132. By pulling the pull rod 131 to move within the sliding chute 132, the retaining ring 134 drives the magnetic attraction component 13 to move together. The retaining ring 134 rotates on the threaded rod 135 via the threaded hole 136, adjusting the positions of the retaining ring 134 and the magnetic attraction component 13 within the movable seat 12, thereby altering the distance between the magnetic attraction component 13 and the phone and consequently changing the magnetic attraction force exerted by the magnetic attraction component 13 on the phone.

Embodiment 4

Figure 12:
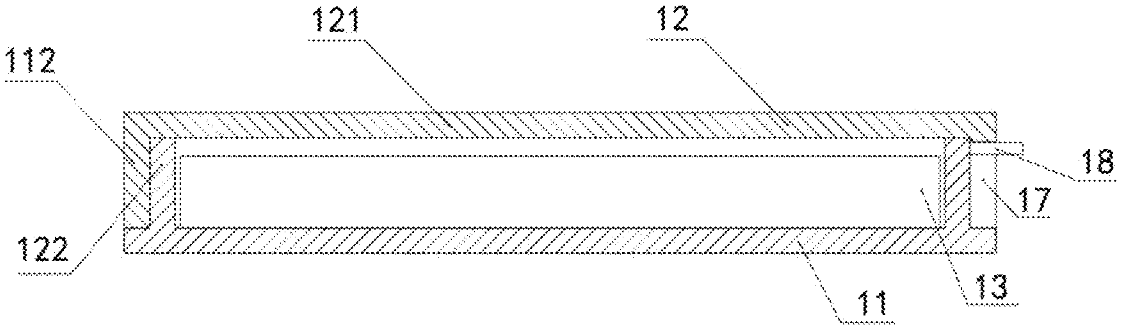
FIG. 12 is a cross-sectional schematic diagram of the magnetic fixation device shown in Embodiment 4 of the present disclosure.
Figure 13:
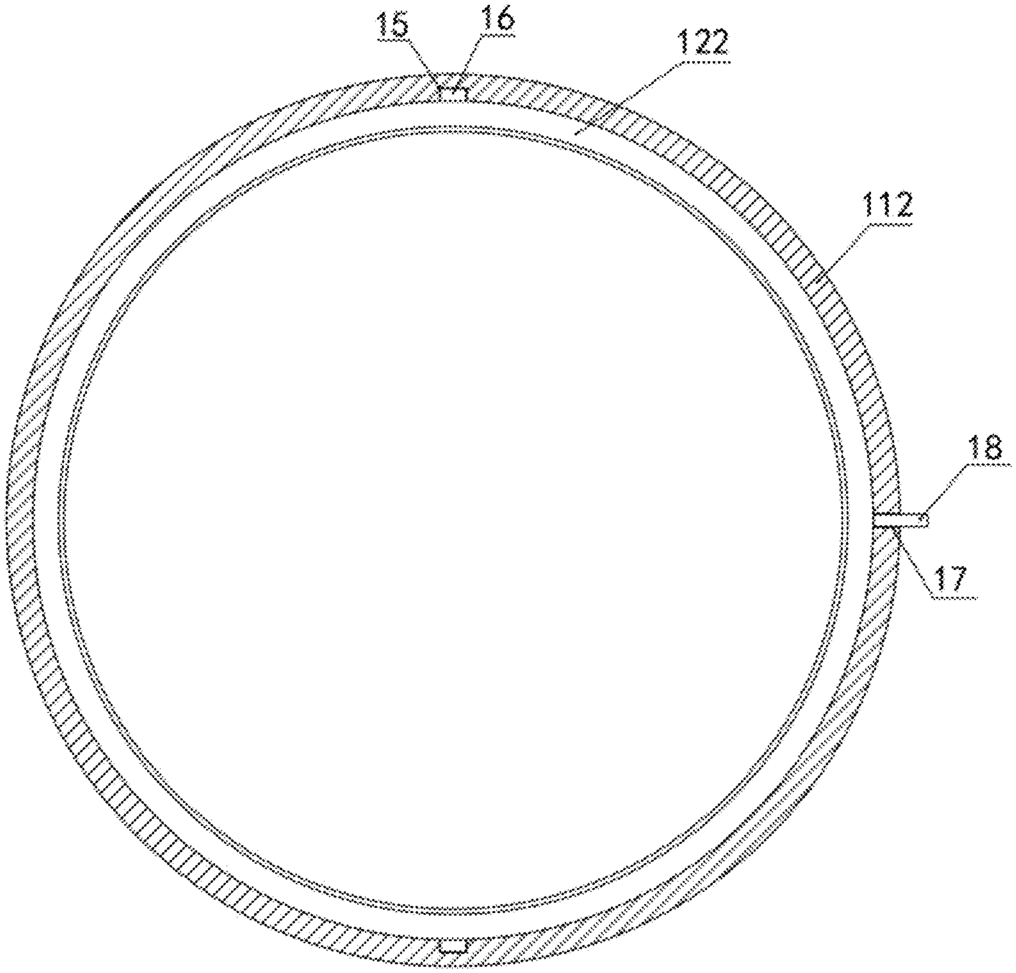
FIG. 13 is a top-view schematic diagram of the magnetic fixation device shown in Embodiment 4 of the present disclosure.

As shown in FIGS. 12 and 13, in this embodiment, a magnetic attraction fixing device with an adjustable magnetic attraction distance includes a fixed seat 11; a movable seat 12, which has a fitting surface 121 for contacting the target object; a magnetic attraction component 13, positioned between the fixed seat 11 and the movable seat 12; and an adjustment mechanism, connecting the fixed seat 11 and the movable seat 12. The adjustment mechanism is configured to change the vertical spacing between the magnetic attraction component 13 and the fitting surface 121 through non-rotational movement of the movable seat 12 relative to the fixed seat 11. The linear variation in vertical spacing results in reversible adjustment of the magnetic attraction force exerted by the magnetic attraction component 13 on the target object.

Here, the adjustment mechanism includes an inner ring 122 and an outer ring 112. The inner ring 122 is positioned at the top of the fixed seat 11, while the outer ring 112 is located at the bottom of the movable seat 12 and is slidably connected to the inner ring 122. By adjusting the distance between the inner ring 122 and the outer ring 112, the distance between the fixed seat 11 and the movable seat 12 is modified. Additionally, the mechanism includes a limiting slot 15 and a limiting block 16. The limiting slot 15 is set on the inner wall of the outer ring 112, and the limiting block 16 is placed on the outer wall of the inner ring 122. The limiting block 16 is slidably arranged within the limiting slot 15, enabling the movable seat 12 to move non-rotationally relative to the fixed seat 11 through the sliding of the limiting block 16 in the limiting slot 15.

The adjustment mechanism further includes a movement hole 17 and a movement rod 18. The movement rod 18 is arranged on the outer side of the inner ring 122, and one side of the outer ring 112 is provided with the movement hole 17 matched with the movement rod 18. By pulling the movement rod 18 to slide inside the movement hole 17, the distance between the movable seat 12 and the fixed seat 11 is adjusted, altering the vertical spacing between the magnetic attraction component 13 and the fitting surface 121, so that the magnetic attraction component 13 changes the distance between the magnetic attraction component 13 and the fitting surface 121, where the linear variation of the vertical spacing causes reversible adjustment of the magnetic attraction force exerted by the magnetic attraction component 13 on the target object, thereby adjusting the magnetic attraction force of the magnetic attraction component 13 on the phone.

In summary, the present disclosure achieves the following technical effects:

By providing a distance adjustment structure between the movable seat 12 and the fixed seat 11, the distance between the movable seat 12 and the fixed seat 11 is altered to adjust the magnetic attraction distance. The change in magnetic attraction distance modifies the magnitude of the magnetic attraction force on the target object, enabling adjustment of the magnetic force strength. This achieves the effect of easily picking up and placing the target object while preventing it from falling easily.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A magnetic attraction fixing device with an adjustable magnetic attraction distance, comprising a fixed seat, a movable seat, and a magnetic attraction component, wherein the movable seat is provided with a fitting surface for contacting a target object, the magnetic attraction component is arranged on the fixed seat and is configured to magnetically attract the target object to be fitted to the fitting surface; and the movable seat is arranged on the fixed seat and rotates around an axis, and a distance adjustment structure is provided between the movable seat and the fixed seat, wherein the movable seat changes the magnetic attraction distance between the fitting surface and the magnetic attraction component through the distance adjustment structure when rotating.

2. The magnetic attraction fixing device with an adjustable magnetic attraction distance according to claim 1, wherein the distance adjustment structure comprises an inner ring and an outer ring sleeved on the inner ring, wherein an inner side wall of the outer ring is provided with one or more spiral chutes, and an outer side wall of the inner ring is provided with a plurality of protrusions that fit into the spiral chutes; and one of the inner ring and the outer ring is connected to the fixed seat, and the other is connected to the movable seat.

3. The magnetic attraction fixing device with an adjustable magnetic attraction distance according to claim 2, wherein the inner ring is connected to the movable seat; or, the inner ring and the movable seat are of an integrated structure.

4. The magnetic attraction fixing device with an adjustable magnetic attraction distance according to claim 2, wherein the outer ring is connected to the fixed seat; or, the outer ring and the fixed seat are of an integrated structure.

5. The magnetic attraction fixing device with an adjustable magnetic attraction distance according to claim 2, wherein an inner side of the outer ring is provided with at least one first limiting part, and an outer side of the inner ring is provided with at least one second limiting part that can cooperate with the first limiting part, wherein the first limiting part and the second limiting part cooperate to limit a rotation position of the movable seat.

6. The magnetic attraction fixing device with an adjustable magnetic attraction distance according to claim 5, wherein the first limiting part is a bump provided on a bottom surface of the spiral chute, and the second limiting part is a recess provided on an end surface of the protrusion.

7. The magnetic attraction fixing device with an adjustable magnetic attraction distance according to claim 2, wherein the inner side wall of the outer ring is further provided with a plurality of insertion slots respectively connected to the spiral chutes, and the insertion slots are arranged corresponding to the protrusions.

8. The magnetic attraction fixing device with an adjustable magnetic attraction distance according to claim 1, wherein the distance adjustment structure comprises an outer ring and an inner ring, wherein the outer ring is sleeved on the inner ring, an inner side wall of the outer ring is provided with internal threads, and an outer side wall of the inner ring is provided with external threads that match with the internal threads; and one of the inner ring and the outer ring is connected to the fixed seat, and the other is connected to the movable seat.

9. The magnetic attraction fixing device with an adjustable magnetic attraction distance according to claim 1, wherein the distance adjustment structure comprises a stud and a boss provided with a screw hole, with the stud engaging with the screw hole, wherein a center of one of the fixed seat and the movable seat is provided with the stud, and a center of the other is provided with the boss.

10. The magnetic attraction fixing device with an adjustable magnetic attraction distance according to claim 9, wherein the distance adjustment structure further comprises an inner ring and an outer ring sleeved on the inner ring, wherein one of the inner ring and the outer ring is connected to the fixed seat, and the other is connected to the movable seat; and an inner side of the outer ring is provided with at least one first limiting part, and an outer side of the inner ring is provided with at least one second limiting part that can cooperate with the first limiting part, wherein the first limiting part and the second limiting part cooperate to limit a rotation position of the movable seat; or, a lock nut is provided between the outer ring and the inner ring.

11. A magnetic attraction fixing device with an adjustable magnetic attraction distance, comprising:

a fixed seat;

a movable seat having a fitting surface for contacting a target object;

a magnetic attraction component arranged between the fixed seat and the movable seat; and a distance adjustment structure, operably connecting the fixed seat and the movable seat, the distance adjustment structure being configured to continuously change an axial spacing between the magnetic attraction component and the fitting surface through a rotational movement of the movable seat relative to the fixed seat;

wherein a magnitude of a magnetic attraction force generated by the magnetic attraction component varies inversely with the axial spacing.

12. The magnetic attraction fixing device with an adjustable magnetic attraction distance according to claim 11, wherein the movable seat is provided with a fitting surface for contacting the target object, the magnetic attraction component is configured to magnetically attract the target object to be fitted to the fitting surface, and the movable seat changes a magnetic attraction distance between the fitting surface and the magnetic attraction component through the distance adjustment structure when rotating.

13. The magnetic attraction fixing device with an adjustable magnetic attraction distance according to claim 11, wherein the distance adjustment structure comprises an inner ring and an outer ring that are sleeved together, wherein an outer side wall of the inner ring is provided with a protrusion, an inner side wall of the outer ring is provided with a spiral chute that is matched with the protrusion, and a movement trajectory of the protrusion in the spiral chute corresponds to a change in the magnetic attraction distance.

14. The magnetic attraction fixing device with an adjustable magnetic attraction distance according to claim 13, wherein the spiral chute is provided with a bump, an end face of the protrusion is provided with a recess that is matched with the bump, and the matching between the bump and the recess forms a rotational positioning structure.

15. The magnetic attraction fixing device with an adjustable magnetic attraction distance according to claim 13, wherein an inner side wall of the outer ring is provided with an insertion slot connected to the spiral chute, and an extension direction of the insertion slot is perpendicular to an extension direction of the spiral chute.

16. The magnetic attraction fixing device with an adjustable magnetic attraction distance according to claim 11, wherein the distance adjustment structure comprises a stud and a screw hole that are threadedly engaged with each other, and an axis of the stud coincides with a rotation axis of the movable seat.

17. The magnetic attraction fixing device with an adjustable magnetic attraction distance according to claim 13, wherein the distance adjustment structure further comprises a limiting groove provided on the inner side wall of the outer ring and a limiting lug provided on the outer side wall of the inner ring.

18. A magnetic attraction fixing device with an adjustable magnetic attraction distance, comprising:

a fixed seat;

a movable seat having a fitting surface for contacting a target object;

a magnetic attraction component arranged between the fixed seat and the movable seat;

an adjustment mechanism connecting the fixed seat and the movable seat, the adjustment mechanism being configured to change a vertical spacing between the magnetic attraction component and the fitting surface through a non-rotational movement of the movable seat relative to the fixed seat;

wherein a linear change in the vertical spacing causes a reversible adjustment of a magnetic attraction force exerted by the magnetic attraction component on the target object.

19. The magnetic attraction fixing device with an adjustable magnetic attraction distance according to claim 18, wherein the adjustment mechanism comprises an inner ring and an outer ring, with the inner ring being arranged at a top of the fixed seat, and the outer ring being arranged at a bottom of the movable seat; the adjustment mechanism further comprises a limiting slot provided on the inner side wall of the outer ring and a limiting block provided on the outer side wall of the inner ring, wherein the limiting block is slidably arranged inside the limiting slot.

20. The magnetic attraction fixing device with an adjustable magnetic attraction distance according to claim 19, further comprising a movement hole and a movement rod arranged on the outer side of the inner ring, wherein one side of the outer ring is provided with the movement hole matched with the movement rod, and the movement rod is slidably arranged inside the movement hole.

* * * * *